United States Patent [19]

Hund

[11] 3,753,754
[45] Aug. 21, 1973

[54] MIXED PHASES OF SPHENE STRUCTURE

[75] Inventor: Franz Hund, Krefeld-Bockum, Germany

[73] Assignee: Bayer Aktiengesellschaft, Leverkusen, Germany

[22] Filed: July 27, 1971

[21] Appl. No.: 166,374

[30] Foreign Application Priority Data

July 31, 1970 Germany............... P 20 38 007.8

[52] U.S. Cl............................................ 106/288 B
[51] Int. Cl. ..................................................... C09c
[58] Field of Search ........................ 106/288 B, 299

[56] References Cited
UNITED STATES PATENTS

| 3,022,186 | 2/1962 | Hund............... | 106/288 B |
| 3,091,544 | 5/1963 | Hund et al. ....... | 106/288 B |
| 3,249,398 | 5/1966 | Bayer............... | 106/288 B |
| 3,424,551 | 1/1969 | Owen............... | 106/299 X |

FOREIGN PATENTS OR APPLICATIONS

| 1,361,074 | 4/1964 | France............ | 106/288 B |
| 1,417,251 | 11/1968 | Germany......... | 106/288 B |

OTHER PUBLICATIONS

Mellor, A Comprehensive Treatise On Inorganic and Theoretical Chemistry, Longmen's Green & Co., N.Y., Vol. 6, pp. 839–859 (1925).

Primary Examiner—Helen M. S. Sneed
Attorney—Ralph D. Dinklage and Arnold Sprung et al.

[57] ABSTRACT

Synthetic mixed phases of sphene structure corresponding to the general formula $MMeZX_5$ or $MMeZX_4Y$ and comprising as host components pure or isotype mixed phases in which M = calcium and/or barium, Me = titanium and/or tin, Z = silicon, X = oxygen and Y = fluorine and/or hydroxyl, comprising at least about 0.1 percent by weight of at least one guest component in place of the aforementioned host components without any change in the sphene structure or in the electroneutrality, the guest component for Z being a di-valent to pentavalent cation with an ionic radius of less than about 0.6 A. and/or a zinc cation, for Me being a mono- to hexavalent cation with a radius of from about 0.45 A. to about 1.0 A. and for M being a mono-to tetra-valent cation with a radius of greater than about 0.9 A., the stoichiometric quantities for (Me+M):Z:(X+Y) being about 2:1:5.

6 Claims, 4 Drawing Figures

MIXED PHASES OF SPHENE STRUCTURE

This invention relates to mixed phases in which compounds of sphene structure occur as the host lattice.

The mineral sphene or titanite corresponding to the formula $CaTiSiO_5$, the mineral tin sphene or malayite corresponding to the formula $CaSnSiO_5$ and the synthetic compound known as barium sphene, $BaTiSiO_5$, have the same general formula and belong to the island silicates with isolated $SiO_4$-units in the lattice. The compound $CaTiSiO_5$ which crystallizes in the spatial group $C_{2h}^6$ with four molecules per monoclinic cell, and the mineral titanite or sphene have the lattice constants, $a = 6.567 \mp 0.005$; $b = 8.723 \pm 0.005$; $c = 7.454 \pm 0.005$ A. and the monoclinic angle $\beta = 119°52' \pm 2'$. From X-ray examinations conducted on the mineral sphene [W. H. Zachariasen, Z. Krist 73, 7 (1930)], the relative diffraction intensities $J/J_1$ and the intervals $d$ in A. of the various lattice planes $h\,k\,l$ are compared with one another in the following Table:

| No. | h | k | l | $J/J_1$ | d/A. | No. | h | k | l | $J/J_1$ | d/A. |
|---|---|---|---|---|---|---|---|---|---|---|---|
| 1 | $\bar{1}$ | 1 | 1 | 30 | 4.93 | 12 | $\bar{3}$ | 1 | 3 | 10 | 1.945 |
| 2 | 1 | 1 | 1(002) | 100 | 3.233 | 13 | $\bar{2}$ | 0 | 4(310) | 5 | 1.848 |
| 3 | $\bar{2}$ | 0 | 2 | 90 | 2.989 | 14 | 0 | 4 | 2(241) | 10 | 1.802 |
| 4 | 2 | 0 | 0 | 5 | 2.841 | 15 | $\bar{3}$ | 3 | 2 | 20 | 1.741 |
| 5 | $\bar{2}$ | 2 | 1(022) | 90 | 2.595 | 16 | 2 | 4 | 0 | 10 | 1.725 |
| 6 | $\bar{1}$ | 1 | 3(220) | 5 | 2.362 | 17 | $\bar{2}$ | 2 | 4 | 30 | 1.703 |
| 7 | 1 | 1 | 2($\bar{1}$32) | 30 | 2.273 | 18 | $\bar{3}$ | 3 | 3 | 40 | 1.645 |
| 8 | 1 | 3 | 1 | 5 | 2.225 | 19 | 1 | 5 | 1(241) | 20 | 1.554 |
| 9 | $\bar{3}$ | 1 | 2 | 20 | 2.101 | 20 | 0 | 4 | 3($\bar{1}$34) | 10 | 1.527 |
| 10 | $\bar{3}$ | 1 | 1 | 40 | 2.058 | 21 | 1 | 3 | 3 | 40 | 1.494 |
| 11 | 2 | 2 | 1 | 10 | 1.972 | 22 | 4 | 0 | 0 | 40 | 1.418 |

The isotype compounds $CaTiSiO_5$ and $CaSnSiO_5$ together form an ideal series of homogenous solid solutions (isotype mixed phases) over the entire range of mixtures of from 0 to 100 mole percent of each.

In order to express the sphene structure in simple terms, the general formula $MMeZX_5$ or $MMeZX_4Y$ is used in the context of this invention to represent both the pure mixed hosts (isotype mixed phases) and the variety of different sphene mixed phases (heterotype mixed phases); in the hosts, M = Ca, Ba; Me = Ti, Sn; Z = Si, X = O$^-$ and Y = O$^-$, OH$^-$, F$^-$.

The production of heterotype mixed phases of the $SiO_2$-or rutile structure as host lattice has already been described (for example Z. anorg. allg. Chemie 321, 1 (1963) and Angew. Chemie 74, 23 (1962)). Under certain conditions, considerably more than half of all the elements of the Periodic System can be incorporated into the aforementioned host lattice as guest components in solid solution in cases where the ratio of the sum total of the newly entering cations to the sum total of the newly entering anions is substantially 2 and in cases where the average statistical cationic radius is within the limits determined by the particular type of structure.

Heterotype mixed-phase formation in a variety of different host lattices represents a commercially interesting field of inorganic chemistry. This oxide and fluoride chemistry with its manifold continuously variable possibilities of modification and its widely expanded fields of solid solutions only has a counterpart in the related field of the chemistry of metals and alloys. From the synthetic point of view, there are considerable possibilities for variation and by selecting suitable host and guest components it is possible systematically to prepare systems with special properties.

It is accordingly an object of the invention to provide a mixed phase of sphene structure containing guest components which impart thereto a spectrum of color values while retaining the original host lattice structure.

In accordance with the invention, synthetic phases of sphene structure corresponding to the general formula $MMeZX_5$ or $MMeXZ_4Y$ have now been found, being distinguished by the fact that they contain as host components pure or isotype mixed phases in which M = calcium and/or barium, Me = titanium and/or tin, Z = silicon, X = oxygen and Y = fluorine and/or the hydroxyl group, and further by the fact that at least 0.1 percent by weight of one or more of the following guest components can occur in place of the aforementioned host components without affecting the sphene structure or electro-neutrality in any way: for Z dipentavalent cations with ionic radii of less than substantially 0.6 A. and zinc cations, for Me mono to hexavalent cations with radii of from substantially 0.45 to 1.0 A. and for M mono- to tetravalent cations with radii of greater than substantially 0.9 A., the stoichiometric ratios for (Me + M):Z:(X + Y) being substantially 2:1:5.

In this connection, the oxides, fluorides or hydroxides which, basically, are not usually consistent in their structure with that of the host, can be incorporated in accordance with the incorporation equations set out in Table 1. Table 2 lists other formulae which show how for example the divalent and trivalent M-cations set out in Table 1, the divalent, trivalent and tetravalent Me-cations and the tetravalent Z-cations can be statistically replaced by differently charged cations.

Any of the elements mentioned in Table 3 represent suitable incorporatable elements.

TABLE 1.—INCORPORATION EQUATIONS FOR SPHENE MIXED PHASES

| | |
|---|---|
| $M^{II}X + Me^{IV}X_2 + Z^{IV}X_2 = M^{II}Me^{IV}Z^{IV}X_5$ | (1) |
| $\tfrac{1}{2}M_2^{I}X + \tfrac{1}{2}Me_2^{V}X_5 + Z^{IV}X_2 = M^{I}Me^{V}Z^{IV}X_5$ | (2) |
| $\tfrac{1}{2}M_2^{III}X_3 + \tfrac{1}{2}Me_2^{III}X_3 + Z^{IV}X_2 = M^{III}Me^{III}Z^{IV}X_5$ | (3) |
| $M^{IV}X_2 + Me^{II}X + Z^{IV}X_2 = M^{IV}Me^{II}Z^{IV}X_5$ | (4) |
| $M^{I}Y + Me^{IV}X_2 + Z^{IV}X_2 = M^{I}Me^{IV}Z^{IV}X_4Y$ | (5) |
| $\tfrac{1}{2}M^{II}Y_2 + \tfrac{1}{2}M^{II}X + \tfrac{1}{2}Me_2^{III}X_3 + Z^{IV}X_2 = M^{II}Me^{III}Z^{IV}X_4Y$ | (6) |
| $\tfrac{1}{2}M_2^{III}X_3 + \tfrac{1}{2}Me^{II}Y_2 + \tfrac{1}{2}Me^{II}X + Z^{IV}X_2 = M^{III}Me^{II}Z^{IV}X_4Y$ | (7) |
| $\tfrac{1}{2}M_2^{III}X_3 + Me^{II}X + \tfrac{1}{2}Z_2^{V}X_5 = M^{III}Me^{II}Z^{V}X_5$ | (8) |
| $M^{II}X + \tfrac{1}{2}Me_2^{III}X_3 + \tfrac{1}{2}Z_2^{V}X_5 = M^{II}Me^{III}Z^{V}X_5$ | (9) |
| $\tfrac{1}{2}M_2^{I}X + Me^{IV}X_2 + \tfrac{1}{2}Z_2^{V}X_5 = M^{I}Me^{IV}Z^{V}X_5$ | (10) |
| $M^{IV}X_2 + \tfrac{1}{2}Me_2^{I}X + \tfrac{1}{2}Z_2^{V}X_5 = M^{IV}Me^{I}Z^{V}X_5$ | (11) |
| $M^{I}Y + \tfrac{1}{2}Me_2^{III}X_3 + \tfrac{1}{2}Z_2^{V}X_5 = M^{I}Me^{III}Z^{V}X_4Y$ | (12) |
| $\tfrac{1}{2}M_2^{III}X_3 + Me^{I}Y + \tfrac{1}{2}Z_2^{V}X_5 = M^{III}Me^{I}Z^{V}X_4Y$ | (13) |
| $\tfrac{1}{2}M^{II}Y_2 + \tfrac{1}{2}M^{II}X + Me^{II}X + \tfrac{1}{2}Z_2^{V}X_5 = M^{II}Me^{II}Z^{V}X_4Y$ | (14) |
| $M^{II}X + \tfrac{1}{2}Me^{I}Y_2 + \tfrac{1}{2}Me^{II}X + \tfrac{1}{2}Z_2^{V}X_5 = M^{II}Me^{II}Z^{V}X_4Y$ | (15) |
| $M^{IV}X_2 + Me^{IV}X_2 + Z^{II}X = M^{IV}Me^{IV}Z^{II}X_5$ | (16) |
| $\tfrac{1}{2}M_2^{III}X_3 + \tfrac{1}{2}Me_2^{V}X_5 + Z^{II}X = M^{III}Me^{V}Z^{II}X_5$ | (17) |
| $M^{II}X + Me^{VI}X_3 + Z^{II}X = M^{II}Me^{VI}Z^{II}X_5$ | (18) |
| $M^{II}X + \tfrac{1}{2}Me_2^{V}X_5 + \tfrac{1}{2}Z_2^{III}X_3 = M^{II}Me^{V}Z^{III}X_4X$ | (19) |
| $\tfrac{1}{2}M_2^{III}X_3 + Me^{IV}X_2 + \tfrac{1}{2}Z_2^{III}X_3 = M^{III}Me^{IV}Z^{III}X_4X$ | (20) |
| $M^{IV}X_2 + \tfrac{1}{2}Me^{III}X_3 + \tfrac{1}{2}Z_2^{III}X_3 = M^{IV}Me^{III}Z^{III}X_4X$ | (21) |

TABLE 2.—STATISTICAL REPLACEMENT OF ELEMENTS IN SPHENE MIXED PHASES

| | | | |
|---|---|---|---|
| (1a) | $M^{II} = \dfrac{M^{I} + M^{III}}{2}$ | (3a) | $Me^{II} = \dfrac{Me^{I} + Me^{III}}{2}$ |
| (1b) | $M^{II} = \dfrac{2M^{I} + M^{IV}}{3}$ | (3b) | $Me^{II} = \dfrac{2Me^{I} + Me^{IV}}{3}$ |
| (2a) | $M^{III} = \dfrac{M^{II} + M^{IV}}{2}$ | (3c) | $Me^{II} = \dfrac{3Me^{I} + Me^{V}}{4}$ |
| (2b) | $M^{III} = \dfrac{M^{I} + 2M^{IV}}{3}$ | (3d) | $Me^{II} = \dfrac{4Me^{I} + Me^{V}}{5}$ |

TABLE 2.—STATISTICAL REPLACEMENT OF ELEMENTS IN SPHENE MIXED PHASES —Continued (4a) $Me^{III} = \frac{Me^{II} + Me^{IV}}{2}$ (4b) $Me^{III} = \frac{Me^{I} + 2Me^{IV}}{3}$ (4c) $Me^{III} = \frac{2Me^{II} + Me^{V}}{3}$ (4d) $Me^{III} = \frac{Me^{I} + Me^{V}}{2}$ (4e) $Me^{III} = \frac{3Me^{II} + Me^{VI}}{4}$ (4f) $Me^{III} = \frac{3Me^{I} + 2Me^{VI}}{5}$ (5a) $Me^{IV} = \frac{Me^{III} + Me^{V}}{2}$ (5b) $Me^{IV} = \frac{Me^{II} + 2Me^{V}}{3}$ (5c) $Me^{IV} = \frac{Me^{I} + 3Me^{V}}{4}$ (5d) $Me^{IV} = \frac{2Me^{III} + Me^{VI}}{3}$ (5e) $Me^{IV} = \frac{Me^{II} + Me^{VI}}{2}$ (5f) $Me^{IV} = \frac{2Me^{I} + 3Me^{VI}}{5}$ (6a) $Z^{IV} = \frac{Z^{III} + Z^{V}}{2}$ (6b) $Z^{IV} = \frac{Z^{II} + 2Z^{V}}{3}$

TABLE 3.—ELEMENTS WHICH CAN BE INCORPORATED IN SPHENE MIXED PHASES

| | |
|---|---|
| $M^I$ | Na, K, Rb, Cs, Fr, Cu, Ag, Tl |
| $M^{II}$ | Ca, Sr, Ba, Ra, Cd, Hg, Eu, Pb, Mn |
| $M^{III}$ | Tl, La, El. 58-71, Ac, El. 91-103, Bi |
| $M^{IV}$ | Ce, Th, U |
| $Me^I$ | Li, Cu, Na |
| $Me^{II}$ | Mg, Zn, Mn, Fe, Co, Ni, Cu, Sn, Pd, Pt |
| $Me^{III}$ | Al, Sc, Ti, Rh, As, Sb, Bi, V, Nb, Cr, Mn, Fe, In, Co |
| $Me^{IV}$ | Ti, Sn, Ge, Zr, Hf, Mn, Cr, Mo, W, Nb, Os, Pt, Pb, Pu, Ru, Tb, Te, W, Ir |
| $Me^V$ | As, Sb, Bi, V, Nb, Ta, Cr, Mn, Pa, At |
| $Me^{VI}$ | Mo, W, Te, U, Os, Po |
| $Z^{II}$ | Be, Zn |
| $Z^{III}$ | B, Al |
| $Z^{IV}$ | Si, Ge, V |
| $Z^V$ | P, As, V, Cr, Mn |
| X | $O^-$ |
| Y | $F^-$, $OH^-$ |

According to H. Strunz Mineralogische Tabellen, 4th Edition, Akad. Verlagsges. Leipzig 1970, page 28, the ions indicated have the following radii (in A.) according to Goldschmidt (1926) or, in the absence thereof, according to Ahrens (1952):

$Na(I) = $ "0.98" $K(I) = $ "1.33" $Rb(I) = $ "1.49" $Cs(I) = $ "1.65"
$Fr(I) = $ "1.80" $Cu(I) = $ "0.96" $Ag(I) = $ "1.13" $Tl(I) = $ "1.49"
$Ca(II) = $ "1.06" $Sr(II) = $ "1.27" $Ba(II) = $ "1.43" $Ra(II) = $ "1.52"
$Cd(II) = $ "1.03" $HG(II) = $ "1.12" $Eu(II) = $ "1.24" $Pb(II) = $ "1.32"
$Mn(II) = $ "0.91" $Te(III) = $ "1.05" $La(III) = $ "1.22" $El58(III) = $ "0.99" $Ac(III) = $ "1.18" $Pa(III) = $ "1.13" $NP(III) = $ "1.10"
$Pu(III) = $ "1.08" $Am(III) = $ "1.07" $Bi(III) = $ "0.96" $Ce(IV) = $ "1.02" $Th(IV) = $ "1.10" $U(IV) = $ "1.05"
$Li(I) = $ "0.78" $Mg(II) = $ "0.78" $Zn(II) = $ "0.83" $Fe(II) = $ "0.82"
$Co(II) = $ "0.82" $Ni(II) = $ "0.78" $Cu(II) = $ "0.72" $Sn(II) = $ "0.93"
$Pd(II) = $ "0.80" $Pt(II) = $ "0.80" $Al(III) = $ "0.57" $Sc(III) = $ "0.83" $Ti(III) = $ "0.69" $Rh(III) = $ "0.68" $As(III) = $ "0.69"
$Sb(III) = $ "0.90" $V(III) = $ "0.65" $Cr(III) = $ "0.64" $Mn(III) = $ "0.70" $Fe(III) = $ "0.67" $In(III) = $ "0.92" $Co(III) = $ "0.64"
$Ti(IV) = $ "0.64" $Sn(IV) = $ "0.74" $Zr(IV) = $ "0.87" $Hf(IV) = $ "0.84"
$Mn(IV) = $ "0.52" $Mo(IV) = $ "0.68" $W(IV) = $ "0.68" $Nb(IV) = $ "0.69"
$Os(IV) = $ "0.67" $Pt(IV) = $ "0.65" $Pb(IV) = $ "0.84" $Pu(IV) = $ "0.93"
$Ru(IV) = $ "0.68" $Tb(IV) = $ "0.89" $Te(IV) = $ "0.89" $W(IV) = $ "0.68"
$Ir(IV) = $ "0.66" $As(V) = $ "0.46" $Sb(V) = $ "0.62" $Bi(V) = $ "0.74"
$V(V) = $ "0.4" $Nb(V) = $ "0.62" $Ta(V) = $ "0.68" $Pa(V) = $ "0.89"
$Mo(VI) = $ "0.62" $W(VI) = $ "0.62" $Te(VI) = $ "0.56" $U(VI) = $ "0.80"
$Os(VI) = $ "0.69" $Po(VI) = $ "0.67"
$Be(II) = $ "0.34" $B(III) = $ "0.23" $Si(IV) = $ "0.39" $Ge(IV) = $ "0.44" $V(IV) = $ "0.61" $P(V) = $ "0.35" $O(II) = $ "1.32" $F(I) = $ "1.33".

On the basis of the incorporation equations set out in Table 1, the tetravalent elements Si, Ge, V can be incorporated in the Z-position in $CaTiSiO_5$, $BaTiSiO_5$, $CaSnSiO_5$ or in the isotype mixed phases of $CaTi_{1-x}Sn_xSiO_5$ in which $x = 0.01$ to $0.99$ as hosts of the general formula $MMeZX_5$ or $MMeZX_4Y$, in accordance with equations (1) to (7), the pentavalent elements P, As, V, Cr, Mn in accordance with equations (8) to (15), the divalent elements Be, Zn in accordance with equations (16) to (20) and the trivalent elements B, Al in accordance with equations (19) to (21), in which case, in the mixed phase pigments formed corresponding to the general formula $MMeZX_5$ or $MMeZX_4Y$, M+Me is generally 2 while electroneutrality is guaranteed. The following general rules can be derived from the individual examples given hereinafter in regard to the ionic radii according to Goldschmidt: with the exception of Zn(II) which has an ionic radius of 0.83 A. but which is known to move very readily into the tetrahedron position, 2- to 5-valent elements with radii of less than about 0.60 A. are found in the Z-position, 1- to 6-valent elements with radii of from about 0.45 A. to about 0.98 A. in the Me-position and 1- to 4-valent elements with radii of greater than 0.90 A. in the M-position. The elements which can be incorporated altogether are set out in Table 3.

The methods used to investigate and display the new sphene mixed phase pigments are the same as those described in Angew. Chemie 74, 23 (1963) for mixed phase pigments of the rutile structure, in Z. anorg. allg. Chem. 321, 1 (1963) for heterotype mixed phases with $SiO_2$-structures and in Ber.dtsch.Keram. Ges. 42, 251 (1965) for heterotype mixed phases of the fluorite or fluorite-like structure.

Sphene mixed phase formation in accordance with the equations set out in Table 1 with $CaTiSiO_5$ or $BaTiSiO_5$ or $CaSnSiO_5$ or the isotype solid solutions of $CaTi_{1-x}Sn_xSiO_5$ with $x = 0.01$ to $0.99$ as hosts was assumed to have taken place when, according to X-ray investigation, at least 10 percent by weight of more of guest components had been incorporated in solid solution into the hosts. Guest components can be incorporated into the host lattice for as long as the sphene structure remains intact. The upper limit of solubility with increasing quantity of guest component has not been determined, although in many cases it would appear to amount to about 50 percent by weight or more, the upper limit being that at which the structure changes significantly. Despite exhaustion of the many possible mixed-phase formations, their chemical composition can be varied to an extent such as has never been known in the chemistry of alloys. All the elements of the Periodic System with the exception of C, N, S, Se, Cl, Br and I and the noble gases can be incorporated through mixed-phase formation into a sphene host lattice on the basis of the 21 incorporation equations.

Literature references have already been quoted in regard to the production of mixed-phase pigments by the methods adopted in the chemistry of solids. The mixed phases can be produced in different ways. First of all, it is possible to heat the separately prepared host substances and the guest substances (each in the required quantity) together in finely powdered form. It is also possible initially to prepare only the host substance or only the guest substance and then to mix it together with the individual components of the particular guest or host substance (again in the required ratio), followed by heating. However, it is preferred simply to mix the individual starting components, both for the host and for the guest component, intimately together, followed by heating. The advantage of this procedure is that effective statistical distribution of the individual components is actually achieved before calcination, thus creating short diffusion paths.

The intensively ground components are heated either in air, $O_2$, $N_2$, $H_2O$ or in noble-gas atmosphere under reduced, normal or excess pressure, to temperatures of from about 200° to 1,500° C and preferably to temperatures of from about 1,100° to 1,400° C. To reduce the reaction temperature, it can be of advantage to add fluxes and fusing agents, so-called mineralizers, to the reaction mixture before or during calcination. Suitable fluxes include alkali-metal and alkaline-earth metal halides, hydroxides, or carbonates, although boron, lead or bismuth oxides and halogen compounds can also be used. Alkali-metal fluorides such as sodium fluoride or potassium fluoride, for example, are particularly suitable.

Although the components can be heated in dry form it is also possible to prepare the reaction mixture by complete or partial reaction in aqueous or liquid organic media. Suitable starting materials include both natural and also syntheticically prepared reactants, in which connection it is not necessary to use only the oxides, fluorides or hydroxides. It is also possible to use thermally unstable compounds of the elements on which the components are based ov their solutions which, when heated, are converted into the components of the mixed-phase pigments. For example, it is also possible to use carbonates, nitrates, oxalates, formates or acetates in the corresponding stoichiometric quantities.

The heating time can be varied within a relatively wide range although periods of from about 5 minutes to 24 hours are usually sufficient. Heating can be carried out either in a single stage or in several stages under different temperature, time and pressure conditions. In this connection, it is possible to work both in an oxidizing atmosphere, i.e., in the presence of oxidizing gases such as oxygen or oxygen-containing gases for example, or in the presence of reducing gases such as hydrogen or carbon monoxide, for example, or in an inert gas atmosphere such as nitrogen or argon for example.

The guest components may be added either all at once or in several stages. The quantity in which the guest components are added in governed both by the host and by the components to be absorbed and also by the required properties of the end product. It has already been mentioned that distinct mixed phase are most readily identified where the guest components are added in quantities of from about 10 percent to less than about 50 percent. However, the guest components can also be present in considerably smaller quantities such as 0.1 percent, for example, and still be technically interesting.

The Examples are set out in Table 4 to 24. The number of the incorporation equation (in some cases subgroup where an element is statistically replaced in accordance with Table 2) is followed by the test number, the theoretical formula of the guest substance, the quantity in which it is present (g) for 5 g of the host, the maximum calcining temperature at which the host lattice alone was still visible in the X-ray photograp̂hs, coming from low temperatures after repeated calcination for 30 minutes and renewed intensive pulverizing of the mixture. The visually observed color of each of the sphene mixed-phase pigments is shown in the last column.

Figure 1:
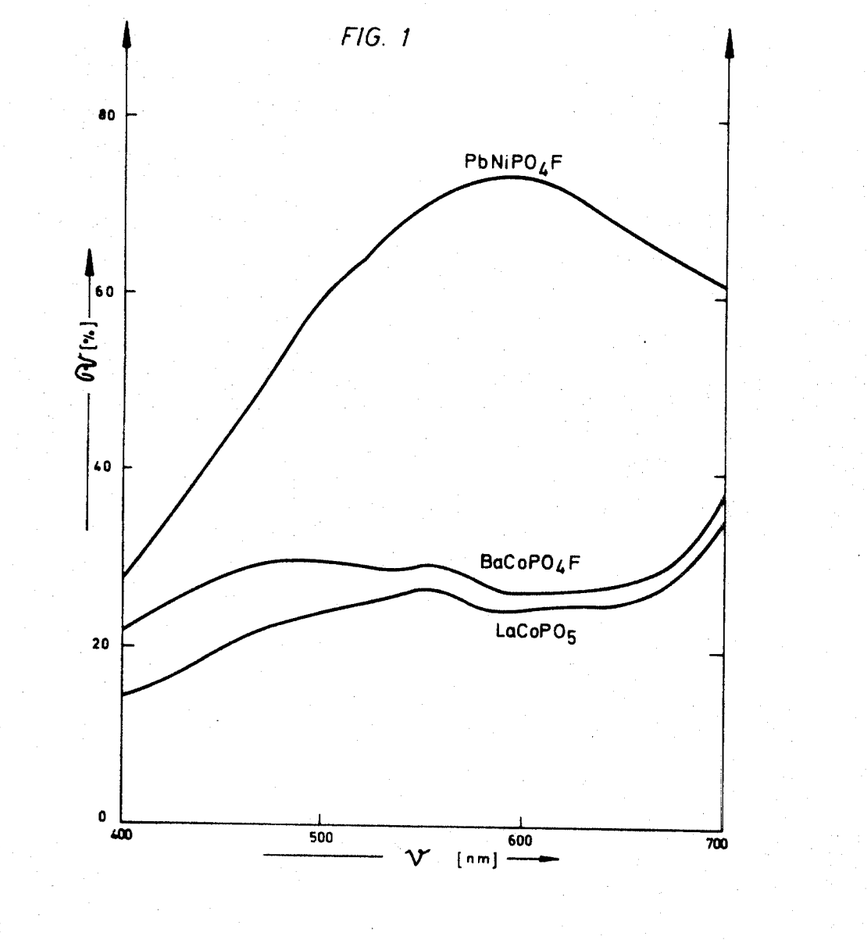
Figure 2:
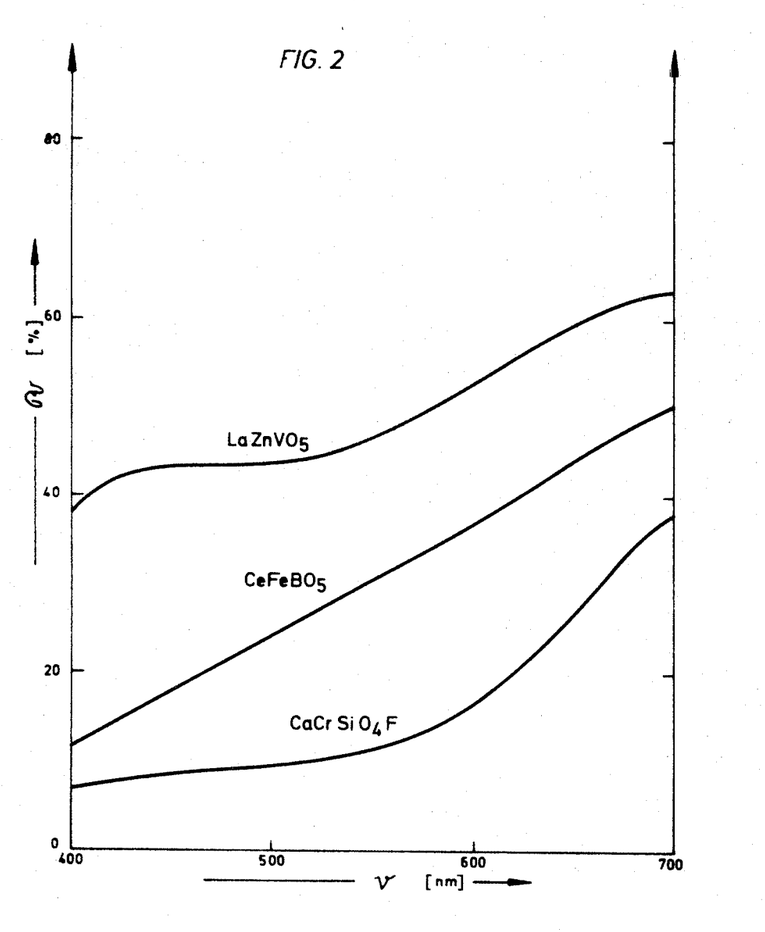
Figure 3:
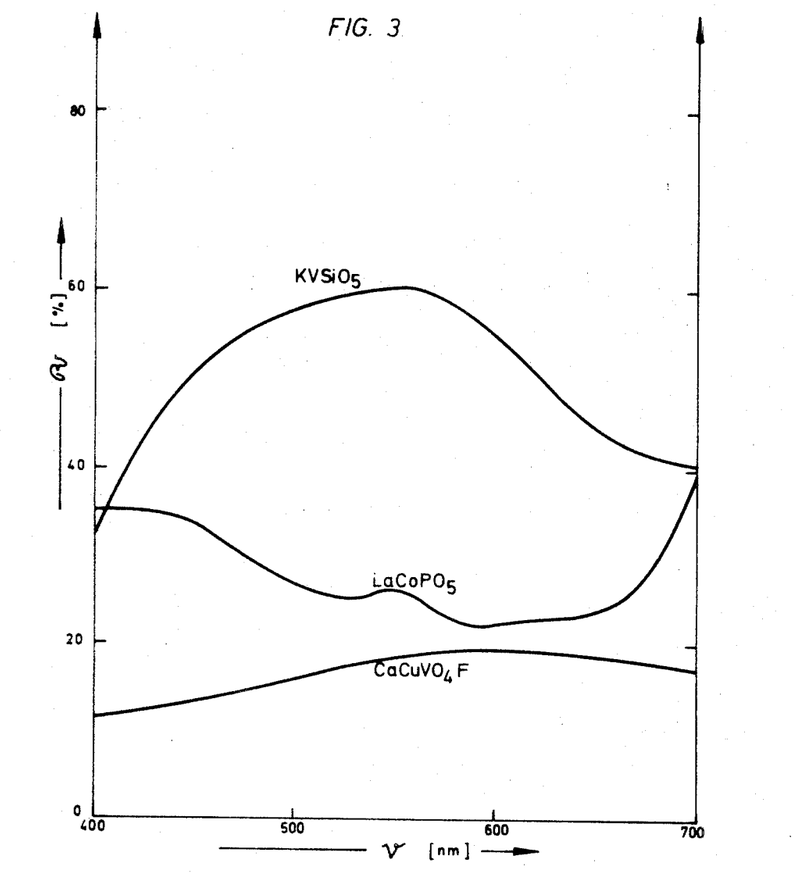
Figure 4:
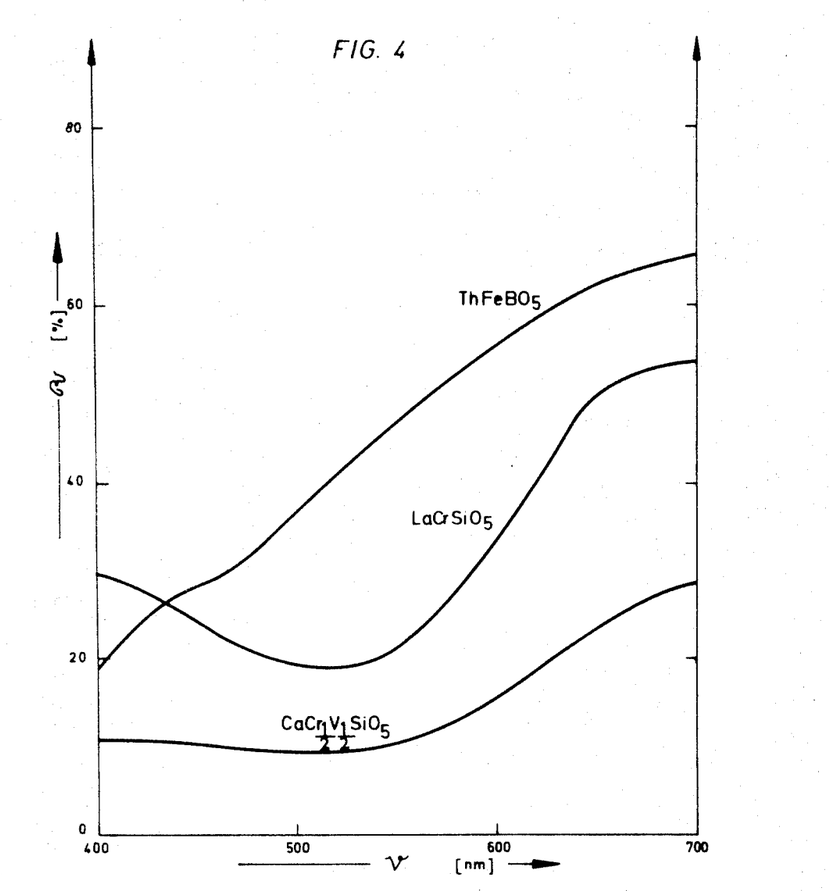

The spectral remission curves for a few selected examples of these novel sphene mixed-phase pigments are shown in FIGS. 1 to 4, the wave length $v$ being plotted on the abscissa and the remission $R$ on the ordinate. With $CaTiSiO_5$ as host, a light gray yellow pigment is found with $PbNiPO_4F$ in FIG. 1 for example, and a green pigment with tinges of gray or a gray pigment with tinges of blue with $LaCoPO_5$ or $BaCoPO_4F$, while in FIG. 2 a beige gray pigment is found with $LaZnVO_5$, a beige brown pigment with $CeFeBO_5$ and a gray brown pigment with $CaCrSiO_4F$. With $CaSnSiO_5$ as host, FIG. 3 shows the spectral remission curve with $KVSiO_5$ for a light green pigment, with $LaCoPO_5$ for a gray violet pigment and with $CaCuVO_4$ for an olive-colored pigment, while FIG. 4 shows the spectral remission curve with $ThFeBO_5$ for a beige-colored pigment, with $LaCrSiO_5$ for a pink brown pigment tinged with blue and with $CaCr_{0.5}V_{0.5}SiO_5$ for a dark brown pigment tinged with violet. In other words it is possible to obtain a variety of required shades with the aid of these mixed phases.

The novel calcium-titanium, barium-titanium, and calcium-tin sphene mixed-phase pigments are valuable high-temperature-resistant inorganic pigments for coloring enamel and ceramic glazes, considerably widening the existing range of colors.

Ceramic products (plates) can be colored with the aforementioned synthetic mixed phases of sphene structure by clouded zircon frits. For this purpose is used for example a zircon enamel containing 56% $SiO_2$, 10.3% $Al_2O_3$, 10.9% $B_2O_3$, 6.7% CaO, 0.1% MgO, 3.6% ZnO, 4.6% $Na_2O$, 1.2% $K_2O$, 6.5% $ZrO_2$, 0.1% $Fe_2O_3$. 100 g of this enamel are mixed in a ball mill at high speed with 2 g of the synthetic mixed phases of sphene structure, e.g., number 46 — $CaTiSiO_5/LaFeSiO_5$ — number 238 — $CaSnSiO_5/LaTrSiO_5$ — or number 247 — $CaSnSiO_5/TbMgSiO_5$ — and 42 ml water.

The slip obtained is applied to ceramic plates at a layer thickness of about 0.8 - 1 mm and well dried. The coated plates are heated in an electric furnace up to about 1,000°C and kept at that temperature for half an hour. Colored enamels of gray-beige, pink-brown and white-yellow color are thus obtained.

Sphene mixed phases with $CaTiSiO_5$ as host
(Incorporation equations 1; 5a-5e; 1/6a)

| Incorporation equation | Test No. | Compound incorporated | Quantity in g. | Max. temp. [° C.] | Color of the mixed phase |
|---|---|---|---|---|---|
| 1 | 1 | $CaMnSiO_5$ | 1.295 | 1,250 | Fawn-olive. |
| 1 | 2 | $CaZrSiO_5$ | 2.618 | 1,350 | Beige-white. |
| 1 | 3 | $PbTiSiO_5$ | 9.260 | 1,150/4h | Pale yellow. |
| 1 | 4 | $MnTiSiO_5$ | 2.000 | 1,250 | Pale olive-gray. |
| 1 | 5 | $CaV^{IV}SiO_5$ | 1.000 | 1,150 | Gray-brown. |
| 1 | 6 | $CaTiGeO_5$ | 5.000 | 1,350 | Yellow-white. |
| 1 | 7 | $CaTiV^{IV}O_5$ | 1.000 | $1,250/N_2$ | Pale gray-brown. |
| 1 | 8 | $PbTiV^{IV}O_5$ | 1.000 | $1,150/N_2$ | Beige-brown-gray. |
| 1 | 9 | $CaSnV^{IV}O_5$ | 1.000 | $1,350/3h/N_2$ | Gray. |
| 1/5a | 10 | $CaAl_{1/2}Sb_{1/2}SiO_5$ | 1.000 | 1,250/3h | White-gray. |
| 1/5a | 11 | $CaRh_{1/2}Sb_{1/2}SiO_5$ | 2.000 | 1,250/3h | Yellow-brown. |
| 1/5a | 12 | $CaCr_{1/2}Sb_{1/2}SiO_5$ | 2.000 | 1,350 | Brown, tinges of olive. |
| 1/5a | 13 | $CaSb_{1/2}Sb_{1/2}SiO_5$ | 2.000 | $1,350/N_2$ | White-gray. |
| 1/5a | 14 | $CaMn_{1/2}Sb_{1/2}SiO_5$ | 2.000 | $1,250/3h/O_2$ | Light-gray olive. |
| 1/5a | 15 | $CaFe_{1/2}Sb_{1/2}SiO_5$ | 2.000 | 1,250/3h | Pale yellow. |
| 1/5a | 16 | $CaFe_{1/2}Sb_{1/2}SiO_5$ | 2.000 | 1,250/3h | Do. |
| 1/5a | 17 | $CaCo_{1/2}Sb_{1/2}SiO_5$ | 2.000 | $1,250/3h/O_2$ | Olive-yellow. |
| 1/5a | 18 | $CaAl_{1/2}V_{1/2}SiO_5$ | 2.000 | 1,250/3h | Yellow-beige. |
| 1/5a | 19 | $CaRh_{1/2}V_{1/2}SiO_5$ | 2.000 | 1,250/3h | Reddish gray-brown. |
| 1/5a | 20 | $CaCr_{1/2}V_{1/2}SiO_5$ | 2.000 | 1,350 | Dark gray-brown. |
| 1/5a | 21 | $CaSb_{1/2}V_{1/2}SiO_5$ | 2.000 | $1,250/3h/N_2$ | Gray-brown. |
| 1/5a | 22 | $CaMn_{1/2}V_{1/2}SiO_5$ | 2.000 | $1,100/O_2$ | Dirty brown. |
| 1/5a | 23 | $CaFe_{1/2}V_{1/2}SiO_5$ | 2.000 | 1,250 | Yellow-olive. |
| 1/5a | 24 | $CaCo_{1/2}V_{1/2}SiO_5$ | 2.000 | $1,100/4h/O_2$ | Green-olive, gray tinges. |
| 1/5a | 25 | $CaFe_{1/2}Nb_{1/2}SiO_5$ | 1.000 | 1,250 | Yellow-gray. |
| 1/5a | 26 | $CaCr_{1/2}Ta_{1/2}SiO_5$ | 1.000 | 1,250 | Dark brown. |
| 1/5b | 27 | $CaNi_{1/3}Nb_{2/3}SiO_5$ | 1.000 | 1,250 | Greenish-gray. |
| 1/5b | 28 | $CaCo_{1/3}Ta_{2/3}SiO_5$ | 1.000 | 1,250 | Green, gray tinges. |
| 1/5b | 29 | $CaZn_{1/3}V_{2/3}SiO_5$ | 1.000 | 1,250 | Brown-gray. |
| 1/5c | 30 | $CaLi_{1/4}V_{3/4}SiO_5$ | 1.000 | 1,250 | Do. |
| 1/5d | 31 | $CaCr_{2/3}W_{1/3}SiO_5$ | 0.5000 | 1,250 | Fawn red brown. |
| 1/5d | 32 | $CaFe_{2/3}W_{1/3}SiO_5$ | 0.5000 | 1,250 | Fawn yellow. |
| 1/5e | 33 | $CaNi_{1/2}W_{1/2}SiO_5$ | 0.500 | 1,250 | Gray-yellow. |
| 1/5e | 34 | $CaCo_{1/2}W_{1/2}SiO_5$ | 0.500 | 1,250 | Pale gray. |
| 1/6a | 35 | $MnTiB_{1/2}P_{1/2}O_5$ | 1.000 | 1,250 | Gray brown. |

Sphene mixed phases with $CaTiSiO_5$ as host (Incorporation equations 2; 3; 3/2a)

| Incorporation equation | Test No. | Compound incorporated | Quantity in g. | Max. temp. [° C.] | Color of the mixed phase |
|---|---|---|---|---|---|
| 2 | 36 | $KSbSiO_5$ | 1.000 | 1,250/3h | Gray, olive tinges. |
| 2 | 37 | $NaVSiO_5$ | 1.000 | 1,150 | Dirty beige. |
| 2 | 38 | $NaTaSiO_5$ | 1.000 | 1,250/3h | Pale gray. |
| 2 | 39 | $NaSbSiO_5$ | 1.000 | 1,250/3h | Pale green gray. |
| 2 | 40 | $AgVSiO_5$ | 1.000 | 1,150 | Beige brown. |
| 2 | 41 | $AgNbSiO_5$ | 1.000 | 1,250/3h | Gray beige. |
| 2 | 42 | $AgSbSiO_5$ | 1.000 | 1,250/3h | Gray violet. |
| 3 | 43 | $LaAlSiO_5$ | 1.000 | 1,250/3h | Whitish yellow. |
| 3 | 44 | $LaMnSiO_5$ | 1.000 | $1,250/O_2$ | Olive-gray. |
| 3 | 45 | $LaCrSiO_5$ | 1.000 | 1,250 | Yellowish brown. |
| 3 | 46 | $LaFeSiO_5$ | 1.000 | 1,250 | Gray-beige. |
| 3 | 47 | $LaCaSiO_5$ | 1.000 | 1,250 | Green gray. |
| 3 | 48 | $NdAlSiO_5$ | 1.000 | 1,250 | Gray white. |
| 3 | 49 | $PrAlSiO_5$ | 1.000 | 1,250 | Gray, yellow tinges. |
| 3 | 50 | $TbAlSiO_5$ | 1.000 | 1,250 | Yellow gray. |
| 3/2a | 51 | $Ca_{1/2}Ce_{1/2}Cr^{III}SiO_5$ | 1.000 | 1,250 | Black-brown. |

Sphene mixed phases with CaTiSiO$_5$ as host (Incorporation equations 4; 5)

| Incorporation equation | Test No. | Compound incorporated | Quantity in g. | Max. temp. [° C.] | Color of the mixed phase |
|---|---|---|---|---|---|
| 4 | 52 | PrMgSiO$_5$ | 1.000 | 1,250/4h/O$_2$ | Greenish yellow. |
| 4 | 53 | TbMgSiO$_5$ | 1.000 | 1,250/O$_2$ | Gray yellow. |
| 4 | 54 | CeMgSiO$_5$ | 1.000 | 1,250 | Beige yellow. |
| 4 | 55 | PrZnSiO$_5$ | 1.000 | 1,250/O$_2$ | Pale yellow. |
| 4 | 56 | TbZnSiO$_5$ | 1.000 | 1,250/O$_2$ | Beige yellow. |
| 4° | 57 | CeZnSiO$_5$ | 1.000 | 1,250 | Do. |
| 4 | 58 | CeCoSiO$_5$ | 1.000 | 1,250 | Dark gray. |
| 4 | 59 | CeCuSiO$_5$ | 1.000 | 1,250 | Beige. |
| 4 | 60 | CeNiSiO$_5$ | 1.000 | 1,250 | Yellow brown. |
| 4 | 61 | CeFeSiO$_5$ | 1.000 | 1,250/N$_2$ | Gray beige. |
| 4 | 62 | CeMnSiO$_5$ | 1.000 | 1,250/N$_2$ | Brown gray. |
| 4 | 63 | ThZnSiO$_5$ | 1.000 | 1,250/6h | Pale yellow. |
| 4 | 64 | ThCoSiO$_5$ | 1.000 | 1,250 | Gray-violet. |
| 4 | 65 | ThCuSiO$_5$ | 1.000 | 1,250 | Brown beige. |
| 4 | 66 | ThNiSiO$_5$ | 1.000 | 1,250 | Do. |
| 4 | 67 | ThFeSiO$_5$ | 1.000 | 1,250/N$_2$ | Yellow brown. |
| 4 | 68 | ThMnSiO$_5$ | 1.000 | 1,250/N$_2$ | Yellow, green tinges. |
| 5 | 69 | KTiSiO$_4$F | 1.000 | 1,150 | White. |
| 5 | 70 | KSnSiO$_4$F | 1.000 | 1,150 | Do. |
| 5 | 71 | NaTiSiO$_4$F | 1.000 | 1,250 | Yellow white. |
| 5 | 72 | NaSnSiO$_4$F | 1.000 | 1,250 | Do. |
| 5 | 73 | NaTiSiO$_4$F | 1.000 | 1,250/3h | White. |

Sphene mixed phases with CaTiSiO$_5$ as host (Incorporation equations 6; 7; 8)

| Incorporation equation | Test No. | Compound incorporated | Quantity in g. | Max. temp. [° C.] | Color of the mixed phase |
|---|---|---|---|---|---|
| 6 | 74 | CaAlSiO$_4$F | 1.000 | 1,250 | Yellow white. |
| 6 | 75 | CaFeSiO$_4$F | 1.000 | 1,250 | Beige, brown tinges. |
| 6 | 76 | CaCrSiO$_4$F | 0.500 | 1,250 | Gray brown. |
| 6 | 77 | CaMnSiO$_4$F | 1.000 | 1,250 | Brown, gray tinges. |
| 6 | 78 | SrCrSiO$_4$F | 1.000 | 1,250 | Yellow brown. |
| 6 | 79 | BaFeSiO$_4$F | 1.000 | 1,250 | Olive yellow. |
| 6 | 80 | BaMnSiO$_4$F | 1.000 | 1,250 | Gray brown. |
| 6 | 81 | PbAlSiO$_4$F | 1.000 | 1,250 | Pale yellow. |
| 6 | 82 | PbCrSiO$_4$F | 1.000 | 1,250 | Brown, gray tinges. |
| 6 | 83 | SrCrSiO$_4$(OH) | 1.000 | 1,250/3h | Blackish brown. |
| 7 | 84 | LaMgSiO$_4$F | 1.000 | 1,250/3h | Whitish gray. |
| 7 | 85 | LaNiSiO$_4$F | 1.000 | 1,250/6h | Yellow, olive tinges. |
| 8 | 86 | LaZnVO$_5$ | 1.000 | 1,250/3h | Brownish-gray. |
| 8 | 87 | LaMnVO$_5$ | 1.000 | 1,150/3h | Dark brown. |
| 8 | 88 | LaFeVO$_5$ | 1.000 | 1,150/3h | Brown yellow. |
| 8 | 89 | LaZnPO$_5$ | 1.000 | 1,250/3h | Blue gray. |
| 8 | 90 | LaMnPO$_5$ | 0.5000 | 1,250/3h | Beige brown. |
| 8 | 91 | LaFePO$_5$ | 1.000 | 1,150/3h | Brown. |
| 8 | 92 | LaCoPO$_5$ | 1.000 | 1,250/3h | Green, gray tinges. |
| 8 | 93 | LaNiPO$_5$ | 1.000 | 1,250/3h | Yellow-gray. |
| 8 | 94 | LaCuPO$_5$ | 1.000 | 1,150 | Gray-green. |

Sphene mixed phases with CaTiSiO$_5$ as host (Incorporation equations 9; 10; 11)

| Incorporation equation | Test No. | Compound incorporated | Quantity in g. | Max. temp. [° C.] | Color of the mixed phase |
|---|---|---|---|---|---|
| 9 | 95 | CaAlPO$_5$ | 1.000 | 1,250/6h | White yellow. |
| 9 | 96 | CaCrPO$_5$ | 1.000 | 1,350 | Gray brown. |
| 9 | 97 | CaSbPO$_5$ | 2.000 | 1,150/4h/N$_2$ | White, gray tinges. |
| 9 | 98 | CaMnPO$_5$ | 1.000 | 1,250/6h/O$_2$ | Dirty yellow. |
| 9 | 99 | CaFePO$_5$ | 1.000 | 1,250/3h | Gray yellow. |
| 9 | 100 | CaCoPO$_5$ | 1.000 | 1,250/3h | Green gray. |
| 10 | 101 | NaSnPO$_5$ | 1.000 | 1,350 | White beige. |
| 10 | 102 | KCePO$_5$ | 0.500 | 1,250/3h | Green gray. |
| 10 | 103 | KTiPO$_5$ | 1.000 | 1,250/3h | Whitish gray. |
| 10 | 104 | KSnPO$_5$ | 1.000 | 1,250/3h | Whitish yellow. |
| 10 | 105 | KCeVO$_5$ | 1.000 | 1,250/3h | Gray brown. |
| 10 | 106 | KTiVO$_5$ | 1.000 | 1,150 | Pale gray brown. |
| 10 | 107 | KSnVO$_5$ | 1.000 | 1,250/3h | Do. |
| 10 | 108 | KSnCrVO$_5$ | 1.000 | 1,250/O$_2$ | Pink violet. |
| 11 | 109 | ThLiVO$_5$ | 1.000 | 1,250/6h | Gray brown. |
| 11 | 110 | CeLiPO$_5$ | 1.000 | 1,250/6h | Yellow olive. |

Sphene mixed phases with CaTiSiO$_5$ as host (Incorporation equations 12; 13)

| Incorporation equation | Test No. | Compound incorporated | Quantity in g. | Max. temp. [° C.] | Color of the mixed phase |
|---|---|---|---|---|---|
| 12 | 111 | KAlPO$_4$F | 0.500 | 1,250 | Dirty white. |
| 12 | 112 | KCrPO$_4$F | 1.000 | 1,150 | Dirty brown. |
| 12 | 113 | NaAlPO$_4$F | 0.500 | 1,250 | Yellow white. |
| 12 | 114 | NaFePO$_4$F | 1.000 | 1,150 | Gray brown. |
| 12 | 115 | NaMnPO$_4$F | 1.000 | 1,150 | Brown, gray tinges. |
| 12 | 116 | KAlVO$_4$F | 1.000 | 1,150 | Pale beige brown. |
| 12 | 117 | NaFeVO$_4$F | 1.000 | 1,150 | Beige brown. |
| 12 | 118 | NaCrVO$_4$F | 1.000 | 1,150 | Dark brown. |
| 12 | 119 | NaMnVO$_4$F | 1.000 | 1,150 | Do. |
| 12 | 120 | NaMnVO$_4$(OH) | 1.000 | 1,150/O$_2$ | Gray brown. |
| 13 | 121 | LaLiVO$_4$F | 1.000 | 1,150 | Do. |
| 13 | 122 | BiLiPO$_4$F | 1.000 | 1,250 | Light gray yellow. |

Sphene mixed phases with $CaTiSiO_5$ as host (Incorporation equations 14; 15)

| Incorporation equation | Test No. | Compound incorporated | Quantity in g. | Max. temp. [° C.] | Color of the mixed phase |
|---|---|---|---|---|---|
| 14/15 | 123 | $CaCoPO_4F$ | 1.000 | 1,150 | Dark green. |
| 14/15 | 124 | $CaNiPO_4F$ | 1.000 | 1,250 | Pale yellow. |
| 14/15 | 125 | $CaCuPO_4F$ | 1.000 | 1,250 | Gray green olive. |
| 14/15 | 126 | $CaZnPO_4F$ | 1.000 | 1,250 | White yellow. |
| 14/15 | 127 | $SrCoPO_4F$ | 1.000 | 1,150/3h | Gray green, blue tinges. |
| 14/15 | 128 | $SrCuPO_4F$ | 0.500 | 1,250 | Yellowish gray-olive. |
| 14/15 | 129 | $SrMgPO_4F$ | 1.000 | 1,250/3h | White yellow. |
| 14/15 | 130 | $BaCoPO_4F$ | 1.000 | 1,150 | Gray, blue tinges. |
| 14/15 | 131 | $BaNiPO_4F$ | 0.500 | 1,250 | Olive yellow. |
| 14/15 | 132 | $BaCuPO_4F$ | 1.000 | 1,150 | Yellow gray green. |
| 14/15 | 133 | $BaZnPO_4F$ | 0.500 | 1,250 | White yellow. |
| 14/15 | 134 | $PbNiPO_4F$ | 1.000 | 1,150 | Pale gray yellow. |
| 14/15 | 135 | $PbZnPO_4F$ | 1.000 | 1,150/3h | Pale yellow. |
| 14/15 | 136 | $CaCoVO_4F$ | 1.000 | 1,150 | Olive gray. |
| 14/15 | 137 | $CaNiVO_4F$ | 0.500 | 1,250 | Gray beige. |
| 14/15 | 138 | $CaCuVO_4F$ | 1.000 | 1,150 | Dark gray. |
| 14/15 | 139 | $CaZnVO_4F$ | 1.000 | 1,150 | Gray beige brown. |
| 14/15 | 140 | $SrNiVO_4F$ | 1.000 | 1,150 | Beige yellow, olive tinges. |
| 14/15 | 141 | $SrZnVO_4F$ | 0.500 | 1,250 | Beige, gray tinges. |
| 14/15 | 142 | $BaNiVO_4F$ | 1.000 | 1,150 | Yellow olive gray tinges. |
| 14/15 | 143 | $BaMgVO_4F$ | 0.500 | 1,250 | Beige, gray tinges. |
| 14/15 | 144 | $PbCuVO_4F$ | 1.000 | 1,150 | Gray olive. |
| 14/15 | 145 | $PbZnVO_4F$ | 0.500 | 1,250 | Light beige. |
| 14/15 | 146 | $CaCoPO_4(OH)$ | 1.000 | 1,250/3h | Gray green. |

Sphene mixed phases with $CaTiSiO_5$ as host (Incorporation equations 16; 17; 18; 19)

| Incorporation equation | Test No. | Compound incorporated | Quantity in g. | Max. temp. [° C.] | Color of the mixed phase |
|---|---|---|---|---|---|
| 16 | 147 | $CeTiBeO_5$ | 1.000 | 1,250/3h | Gray green. |
| 16 | 148 | $CeSnBeO_5$ | 1.000 | 1,250/3h | Gray yellow brown. |
| 17 | 149 | $LaNbBeO_5$ | 1.000 | 1,250/3h | Light gray. |
| 17 | 150 | $LaVBeO_5$ | 1.000 | 1,250/3h | Light gray brown. |
| 18 | 151 | $PbWBeO_5$ | 0.500 | 1,250/2h | Beige yellow. |
| 19 | 152 | $CaVBO_5$ | 1.000 | 1,150 | Light brown gray. |
| 19 | 153 | $CaNbBO_5$ | 1.000 | 1,250/3h | Light gray. |
| 19 | 154 | $CaTaBO_5$ | 1.000 | 1,250/3h | Do. |
| 19 | 156 | $CaSbBO_5$ | 1.000 | 1,250/3h | Greenish gray. |
| 19 | 157 | $BaVBO_5$ | 1.000 | 1,150 | Gray brown. |
| 19 | 158 | $BaNbBO_5$ | 0.500 | 1,250/3h | Light gray. |
| 19 | 159 | $BaTaBO_5$ | 1.000 | 1,250/3h | Do. |
| 19 | 160 | $BaSbBO_5$ | 1.000 | 1,250/3h | Green gray. |

Sphene mixed phases with $CaTiSiO_5$ as host (Incorporation equations 20; 20/2a)

| Incorporation equation | Test No. | Compound incorporated | Quantity in g. | Max. temp. [° C.] | Color of the mixed phase |
|---|---|---|---|---|---|
| 20 | 161 | $PrTiBO_5$ | 1.000 | 1,150 | Light gray yellow. |
| 20 | 162 | $TbTiBO_5$ | 1.000 | 1,250 | Gray beige. |
| 20 | 163 | $NdTiBO_5$ | 1.000 | 1,250 | Brown gray. |
| 20 | 164 | $CeTiBO_5$ | 1.000 | $1,150/N_2$ | Gray beige brown. |
| 20 | 165 | $PrSnBO_5$ | 1.000 | 1,150 | Yellow, gray tinges. |
| 20 | 166 | $TbSnBO_5$ | 1.000 | 1,250 | Whitish beige. |
| 20 | 167 | $NdSnBO_5$ | 1.000 | 1,250 | White gray. |
| 20 | 168 | $CeSnBO_5$ | 1.000 | $1,150/N_2$ | Beige gray. |
| 20 | 169 | $LaCr^{IV}BO_5$ | 1.000 | $1,250/O_2$ | Reddish brown. |
| 20 | 170 | $EuSnBO_5$ | 1.000 | 1,350 | Light blue gray. |
| 20 | 171 | $PrSnAlO_5$ | 1.000 | 1,250 | Green yellow. |
| 20 | 172 | $LaCr^{IV}AlO_5$ | 0.500 | 1,250 | Brown gray. |
| 20 | 173 | $LaSnAlO_5$ | 1.000 | 1,250 | Gray yellow. |
| 20/2a | 174 | $Pr_{1/2}Ca_{1/2}TiBO_5$ | 1.000 | $1,250/O_2$ | Pale yellow. |
| 20/2a | 175 | $Tb_{1/2}Ca_{1/2}TiBO_5$ | 1.000 | $1,250/O_2$ | Beige yellow. |
| 20/2a | 176 | $Ce_{1/2}Ca_{1/2}TBO_5$ | 1.000 | 1,250/6h | Light yellow beige. |
| 20/2a | 177 | $Pr_{1/2}Ca_{1/2}SnBO_5$ | 1.000 | $1,350/O_2$ | Light gray. |
| 20/2a | 178 | $Tb_{1/2}Ca_{1/2}SnBO_5$ | 1.000 | $1,350/O_2$ | Do. |
| 20/2a | 179 | $Ce_{1/2}Ca_{1/2}SnBO_5$ | 1.000 | 1,250 | Gray yellow. |
| 20/2a | 180 | $Ce_{1/2}Ca_{1/2}SnAlO_5$ | 1.000 | 1,250 | Do. |

Sphene mixed phases with $CaTiSiO_5$ as host (Incorporation equation 21)

| Incorporation equation | Test No. | Compound incorporated | Quantity in g. | Max. temp. [° C.] | Color of the mixed phase |
|---|---|---|---|---|---|
| 21 | 181 | $PrAlBO_5$ | 1.000 | $1,250/O_2$ | Light yellow. |
| 21 | 182 | $TbAlBO_5$ | 1.000 | $1,250/O_2$ | Beige yellow. |
| 21 | 183 | $CeAlBO_5$ | 1.000 | 1,250 | Beige gray. |
| 21 | 184 | $CeCrBO_5$ | 1.000 | 1,250/3h | Dark olive. |
| 21 | 185 | $CeMnBO_5$ | 1.000 | 1,250/3h | Brown, red tinges. |
| 21 | 186 | $CeFeBO_5$ | 1.000 | 1,150/3h | Beige brown. |
| 21 | 187 | $ThCrBO_5$ | 1.000 | 1,250/3h | Dark brown. |
| 21 | 188 | $ThMnBO_5$ | 0.500 | 1,250/3h | Brown beige. |
| 21 | 189 | $ThFeBO_5$ | 1.000 | 1,250/3h | Gray, olive tinges. |

Sphene mixed phases with CaTiSiO₅ as host

| Incorporation equation | Test No. | Compound incorporated | Quantity in g. | Max. temp. [° C.] | Color of the mixed phase |
|---|---|---|---|---|---|
| 1/5a | 190 | $BaCr_{1/2}V_{1/2}SiO_5$ | 1.000 | 1,150 | Yellow olive. |
| 1/5a | 191 | $BaCr_{1/2}Sb_{1/2}SiO_5$ | 1.000 | 1,150 | Olive. |
| 2 | 192 | $KVSiO_5$ | 1.000 | 1,150 | Beige yellow. |
| 3 | 193 | $LaCrSiO_5$ | 1.000 | 1,150 | Olive. |
| 5 | 194 | $BaCrSiO_4F$ | 1.000 | 1,150 | Do. |
| 8 | 195 | $LaCoPO_5$ | 1.000 | 1,150 | Violet blue. |
| 8 | 196 | $LaZnVO_5$ | 1.000 | 1,000 | Light gray yellow. |
| 12 | 197 | $KCrVO_4F$ | 1.000 | 1,150 | Gray-olive. |
| 12 | 198 | $KCrVO_4(OH)$ | 1.000 | 1,150 | Olive. |
| 14 | 199 | $BaCoVO_4F$ | 1.000 | 1,150 | Do. |
| 14 | 200 | $BaCuVO_4F$ | 1.000 | 1,150 | Gray beige brown. |
| 14 | 201 | $BaCoPO_4F$ | 1.000 | 1,150 | Gray. |
| 14 | 202 | $BaCoVO_4(OH)$ | 0.500 | 1,000 | Dark brown. |
| 14 | 203 | $PbNiPO_4F$ | 1.000 | 1,150 | Green yellow. |
| 20 | 204 | $PrSnBO_5$ | 1.000 | 1,150 | Yellow, green tinges. |
| 21 | 205 | $ThMn^{III}BO_5$ | 0.500 | 1,150 | Beige brown. |
| 21 | 206 | $ThFeBO_5$ | 0.500 | 1,150 | Gray yellow, olive tinges. |
| 21 | 207 | $ThCrBO_5$ | 0.500 | 1,150/4h | Gray-olive. |
| 21 | 208 | $CeAlBO_5$ | 1.000 | 1,000 | White gray. |
| 21 | 209 | $CeFeBO_5$ | 1.000 | 1,150 | Brown beige. |

Sphene mixed phases with CaSnSiO₅ as host (Incorporation equations 1; 1/5a)

| Incorporation equation | Test No. | Compound incorporated | Quantity in g. | Max. temp. [° C.] | Color of the mixed phase |
|---|---|---|---|---|---|
| 1 | 210 | $CaCr^{IV}SiO_5$ | 2.000 | 1,350 | Brown, violet tinges. |
| 1 | 211 | $CaFe^{IV}SiO_5$ | 2.000 | 1,250/3h/$O_2$ | Gray brown. |
| 1 | 212 | $PbSnSiO_5$ | 1.250 | 1,350 | White yellow. |
| 1 | 213 | $CaCr^{IV}SiO_5$ | 0.100 | 1,350/$O_2$ | Violet, gray tinges. |
| 1 | 214 | $CaMn^{IV}SiO_5$ | 1.631 | 1,250/3h | Dark brown. |
| 1/5a | 215 | $CaAl_{1/2}Sb_{1/2}SiO_5$ | 2.000 | 1,250 | Gray white. |
| 1/5a | 216 | $CaRh_{1/2}Sb_{1/2}SiO_5$ | 1.000 | 1,250/6h | Beige brown. |
| 1/5a | 217 | $CaMn_{1/2}Sb_{1/2}SiO_5$ | 1.000 | 1,250/3h | Gray, brown tinges. |
| 1/5a | 218 | $CaFe_{1/2}Sb_{1/2}SiO_5$ | 2.000 | 1,250 | Dirty yellow. |
| 1/5a | 219 | $CaAl_{1/2}V_{1/2}SiO_5$ | 2.000 | 1,250 | White yellow. |
| 1/5a | 220 | $CaRh_{1/2}V_{1/2}SiO_5$ | 2.000 | 1,250/3h | Brown gray, pink tinges. |
| 1/5a | 221 | $CaCr_{1/2}V_{1/2}SiO_5$ | 2.000 | 1,350 | Greenish gray. |
| 1/5a | 222 | $CaSb_{1/2}V_{1/2}SiO_5$ | 2.000 | 1,150/4h | Light blue gray. |
| 1/5a | 223 | $CaMn_{1/2}V_{1/2}SiO_5$ | 2.000 | 1,110/4h | Gray yellow. |
| 1/5a | 224 | $CaFe_{1/2}V_{1/2}SiO_5$ | 2.000 | 1,350 | Orange yellow, olive tinges. |
| 1/5a | 225 | $CaCo_{1/2}V_{1/2}SiO_5$ | 2.000 | 1,100/4h | Gray, blue tinges. |

Sphene mixed phases with CaSnSiO₅ as host (Incorporation equations 2; 3)

| Incorporation equation | Test No. | Compound incorporated | Quantity in g. | Max. temp. [° C.] | Color of the mixed phase |
|---|---|---|---|---|---|
| 2 | 226 | $KVSiO_5$ | 1.000 | 1,250/3h | Light green. |
| 2 | 227 | $KNbSiO_5$ | 1.000 | 1,250 | Light gray. |
| 2 | 228 | $KTaSiO_5$ | 1.000 | 1,250 | White gray. |
| 2 | 229 | $NaVSiO_5$ | 1.000 | 1,250 | Yellow, green tinges. |
| 2 | 230 | $NaNbSiO_5$ | 1.000 | 1,250 | Whitish gray. |
| 2 | 231 | $NaTaSiO_5$ | 1.000 | 1,250/6h | White. |
| 2 | 232 | $NaSbSiO_5$ | 1.000 | 1,250/3h | Light gray. |
| 2 | 233 | $AgVSiO_5$ | 1.000 | 1,250/3h | Green gray. |
| 2 | 234 | $AgNbSiO_5$ | 1.000 | 1,250/3h | Whitish gray. |
| 2 | 235 | $AgSbSiO_5$ | 1.000 | 1,250/3h | Whitish yellow gray. |
| 3 | 236 | $LaAlSiO_5$ | 0.500 | 1,350/2h | Gray white. |
| 3 | 237 | $LaMnSiO_5$ | 0.500 | 1,350 | Gray brown. |
| 3 | 238 | $LaCrSiO_5$ | 1.000 | 1,350 | Pink brown, gray tinges. |
| 3 | 239 | $LaFeSiO_5$ | 1.000 | 1,350 | Beige gray. |
| 3 | 240 | $LaCo^{III}SiO_5$ | 0.500 | 1,350/2h | Blueish gray. |
| 3 | 241 | $NdAlSiO_5$ | 1.000 | 1,350 | White, violet tinges. |
| 3 | 242 | $PrAlSiO_5$ | 0.500 | 1,350/2h | Whitish green yellow. |
| 3 | 243 | $GbAlSiO_5$ | 0.500 | 1,350 | Whitish yellow. |
| 3 | 244 | $LaCrSiO_5$ | 2.000 | 1,350 | Gray brown. |
| 3 | 245 | $LaCrSiO_5$ | 2.000 | 1,350 | Do. |

Sphene mixed phases with CaSnSiO₅ as host (Incorporation equations 5; 5)

| Incorporation equation | Test No. | Compound incorporated | Quantity in g. | Max. temp. [° C.] | Color of the mixed phase |
|---|---|---|---|---|---|
| 4 | 246 | $PrMgSiO_5$ | 0.500 | 1,350/$O_2$ | Gray yellow. |
| 4 | 247 | $TbMgSiO_5$ | 1.000 | 1,350/$O_2$ | Whitish yellow. |
| 4 | 248 | $CeMgSiO_5$ | 1.000 | 1,350 | Blueish gray. |
| 4 | 249 | $PrZnSiO_5$ | 0.500 | 1,350/$O_2$ | Gray yellow. |
| 4 | 250 | $TbZnSiO_5$ | 1.000 | 1,350/$O_2$ | Do. |
| 4 | 251 | $CeZnSiO_5$ | 1.000 | 1,350 | Light gray. |
| 4 | 252 | $CeCoSiO_5$ | 1.000 | 1,350 | Blueish gray. |
| 4 | 253 | $CeCuSiO_5$ | 1.000 | 1,350 | Beige brown gray. |
| 4 | 254 | $CeNiSiO_5$ | 1.000 | 1,350 | Gray, olive tinges. |

Sphene mixed phases with CaSnSiO$_5$ as host—Continued

| Incorporation equation | Test No. | Compound incorporated | Quantity in g. | Max. temp. [°C.] | Color of the mixed phase |
|---|---|---|---|---|---|
| 4 | 255 | CeMnSiO$_5$ | 1.000 | 1,350 | Beige gray. |
| 4 | 256 | ThZnSiO$_5$ | 1.000 | 1,350 | Whitish gray yellow. |
| 4 | 257 | ThCoSiO$_5$ | 1.000 | 1,350 | Gray violet, blue tinges. |
| 4 | 258 | ThCuSiO$_5$ | 1.000 | 1,350 | Light gray green. |
| 4 | 259 | ThNiSiO$_5$ | 1.000 | 1,350 | Light gray beige. |
| 4 | 260 | ThFeSiO$_5$ | 1.000 | 1,150/N$_2$/8h | Pale yellow. |
| 4 | 261 | ThMnSiO$_5$ | 1.000 | 1,350/N$_2$ | Whitish yellow. |
| 5 | 262 | KTiSiO$_4$F | 1.000 | 1,250 | White. |
| 5 | 263 | KSnSiO$_4$F | 0.500 | 1,250 | White yellow. |
| 5 | 264 | NaTiSiO$_4$F | 0.500 | 1,250 | Yellow white. |
| 5 | 265 | KTiSiO$_4$(OH) | 1.000 | 1,250/3h | White Pink. |

Sphene mixed phases with CaSnSiO$_5$ as host (Incorporation equations 6; 7)

| Incorporation equation | Test No. | Compound incorporated | Quantity in g. | Max. temp. [°C.] | Color of the mixed phase |
|---|---|---|---|---|---|
| 6 | 266 | CaAlSiO$_4$F | 1.000 | 1,250 | White. |
| 6 | 267 | CaFeSiO$_4$F | 1.000 | 1,150 | Brown yellow, olive tinges. |
| 6 | 268 | CaCrSiO$_4$F | 0.500 | 1,250 | Brown pink red. |
| 6 | 269 | CaMnSiO$_4$F | 1.000 | 1,250 | Beige, olive tinges. |
| 6 | 270 | BaFeSiO$_4$F | 1.000 | 1,250 | Beige yellow. |
| 6 | 271 | BaMnSiO$_4$F | 1.000 | 1,250 | Gray brown. |
| 6 | 272 | PbAlSiO$_4$F | 0.500 | 1,250 | White yellow. |
| 6 | 273 | PbSrSiO$_4$F | 1.000 | 1,250 | Brownish violet. |
| 6 | 274 | CaCrSiO$_4$(OH) | 1.000 | 1,250/3h | Pink colored. |
| 7 | 275 | LaMgSiO$_4$F | 0.500 | 1,250/3h | Dirty white. |
| 7 | 276 | BiMgSiO$_4$F | 1.000 | 1,250/3h | White yellow. |
| 7 | 277 | LaNiSiO$_4$F | 0.500 | 1,250/3h | Brown beige yellow. |

Sphene mixed phases with CaSnSiO$_5$ as host (Incorporation equations 8; 9)

| Incorporation equation | Test No. | Compound incorporated | Quantity in g. | Max. temp. [°C.] | Color of the mixed phase |
|---|---|---|---|---|---|
| 8 | 278 | LaZnVO$_5$ | 1.000 | 1,250/3h | Whitish green. |
| 8 | 279 | LaMnVO$_5$ | 1.000 | 1,250 | Beige brown. |
| 8 | 280 | LaFeVO$_5$ | 1.000 | 1,250 | Brown beige. |
| 8 | 281 | LaZnPO$_5$ | 0.500 | 1,250 | White. |
| 8 | 282 | LaMnPO$_5$ | 0.500 | 1,250 | Reddish brown. |
| 8 | 283 | LaFePO$_5$ | 0.500 | 1,250 | Beige yellow. |
| 8 | 284 | LaCePO$_5$ | 0.500 | 1,250 | Gray-violet. |
| 8 | 285 | LaNiPO$_5$ | 0.500 | 1,250 | Gray beige. |
| 8 | 286 | LaCuPO$_5$ | 1.000 | 1,250/6h | Light gray green. |
| 9 | 287 | CaRhPO$_5$ | 2.000 | 1,350 | Dark brown. |
| 9 | 289 | CaCrPO$_5$ | 2.000 | 1,250/3h | Violet. |
| 9 | 290 | CaCrVO$_5$ | 2.000 | 1,350 | Blackish brown. |
| 9 | 291 | CaFeVO$_5$ | 2.000 | 1,150/4h | Orange yellow. |

Sphene mixed phases with CaSnSiO$_5$ as host (Incorporation equations 10; 11; 12)

| Incorporation equation | Test No. | Compound incorporated | Quantity in g. | Max. temp. [°C.] | Color of the mixed phase |
|---|---|---|---|---|---|
| 10 | 292 | NAFe$^{IV}$VO$_5$ | 2.000 | 1,150/4h | Green, olive tinges. |
| 10 | 293 | KCePO$_5$ | 0.500 | 1,250/3h | Light gray. |
| 10 | 294 | KTiPO$_5$ | 0.500 | 1,250/6h | White, pink tinges. |
| 10 | 295 | KSnPO$_5$ | 0.500 | 1,250 | Do. |
| 10 | 296 | KCeVO$_5$ | 1.000 | 1,250/3h | Light gray green. |
| 10 | 297 | KTiVO$_5$ | 1.000 | 1,250 | Light yellow gray. |
| 10 | 298 | KSnVO$_5$ | 1.000 | 1,250/6h | Light green. |
| 10 | 299 | KSnCrO$_5$ | 1.000 | 1,250/3h/O$_2$ | Pink violet. |
| 10 | 300 | NaV$^{IV}$PO$_5$ | 0.500 | 1,250 | Whitish yellow. |
| 11 | 301 | ThLiVO$_5$ | 0.500 | 1,250/3h | Whitish gray yellow. |
| 11 | 302 | CeNaVO$_5$ | 1.000 | 1,250 | Light greenish. |
| 12 | 303 | NaCrVO$_4$F | 0.500 | 1,250 | Violet brown. |
| 12 | 304 | KFeVO$_4$F | 1.000 | 1,250/3h | Beige bown. |
| 12 | 305 | KFeVO$_4$(OH) | 1.000 | 1,250/3h | Brown beige. |

Sphene mixed phases with CaSnSiO$_5$ as host (Incorporation equations 13; 14/15; 16; 17)

| Incorporation equation | Test No. | Compound incorporated | Quantity in g. | Max. temp. [°C.] | Color of the mixed phase |
|---|---|---|---|---|---|
| 13 | 306 | LaLiVO$_4$F | 1.000 | 1,250/3h | Greenish, white gray. |
| 13 | 307 | BiLiPO$_4$F | 0.500 | 1,250/3h | Dirty white. |
| 14/15 | 308 | CaCoVO$_4$F | 1.000 | 1,150 | Gray, green tinges. |
| 14/15 | 309 | CaNiVO$_4$F | 0.500 | 1,250 | Greenish gray yellow. |
| 14/15 | 310 | CaCuVO$_4$F | 1.000 | 1,150 | Olive-gray. |
| 14/15 | 311 | CaZnVO$_4$F | 0.500 | 1,250 | Fawn yellow green. |
| 14/15 | 312 | PbCuVO$_4$F | 1.000 | 1,150 | Olive, gray tinges. |
| 14/15 | 313 | PbZnVO$_4$F | 0.500 | 1,250 | Whitish yellow green. |
| 14/15 | 314 | CaCoVO$_4$(OH) | 1.000 | 1,150 | Dark gray green. |
| 16 | 315 | CeTiBeO$_5$ | 1.000 | 1,250/3h | Light green gray. |
| 16 | 316 | CeSnBeO$_5$ | 0.500 | 1,250/3h | Gray, green tinges. |
| 17 | 317 | LaNbBeO$_5$ | 0.500 | 1,250/3h | White. |
| 17 | 318 | LaVBeO$_5$ | 0.500 | 1,250/3h | Green, yellow tinges. |

Sphene mixed phases with CaSnSiO₅ as host (Incorporation equations 18; 19; 20)

| Incorporation equation | Test No. | Compound incorporated | Quantity in g. | Max. temp. [° C.] | Color of the mixed phase |
|---|---|---|---|---|---|
| 18 | 319 | CaWBeO₅ | 0.500 | 1,250/3h | White pink. |
| 18 | 320 | PbWBeO₅ | 0.500 | 1,250 | Do. |
| 19 | 321 | CaVBO₅ | 0.500 | 1,250/3h | Light yellow green. |
| 19 | 322 | CaNbBO₅ | 1.000 | 1,250/6h | Light gray. |
| 19 | 323 | CaTaBO₅ | 1.000 | 1,250/3h | White gray. |
| 19 | 324 | CaSbBO₅ | 0.500 | 1,250 | Light blue gray. |
| 19 | 325 | BaVBO₅ | 0.500 | 1,250 | Whitish yellow green. |
| 19 | 326 | BaNbBO₅ | 0.500 | 1,250 | White gray. |
| 19 | 327 | BaTaBO₅ | 1.000 | 1,250 | Whitish gray. |
| 19 | 328 | BaSbBO₅ | 1.000 | 1,250 | Light blue gray. |
| 20 | 329 | PrTiBO₅ | 0.500 | 1,350 | Light green yellow. |
| 20 | 330 | TbTiBO₅ | 1.000 | 1,350 | Beige yellow. |
| 20 | 331 | NdTiBO₅ | 0.500 | 1,350 | White gray. |
| 20 | 332 | CeTiBO₅ | 1.000 | 1,150/8h/N₂ | Brown gray. |
| 20 | 333 | PrSnBO₅ | 1.000 | 1,350 | Whitish yellow. |
| 20 | 334 | TbSnBO₅ | 1.000 | 1,350 | White yellow. |
| 20 | 335 | NdSnBO₅ | 1.000 | 1,350 | Violet gray. |
| 20 | 336 | CeSnBO₅ | 1.000 | 1,150/8h/N₂ | Whitish green gray. |
| 20 | 337 | LaCr^IV BO₅ | 1.000 | 1,350/O₂ | Brown gray. |
| 20 | 338 | LaTiAlO₅ | 1.000 | 1,250/3h | White. |
| 20 | 339 | NdSnAlO₅ | 1.000 | 1,250 | Do. |
| 20 | 340 | CeTiAlO₅ | 1.000 | 1,250 | Whitish gray. |

Sphene mixed phases with CaSnSnSiO₅ as host (Incorporation equations 20/2a; 21)

| Incorporation equation | Test No. | Compound incorporated | Quantity in g. | Max. temp. [° C.] | Color of the mixed phase |
|---|---|---|---|---|---|
| 20/2a | 341 | Pr₁/₂Ca₁/₂TiBO₅ | 1.000 | 1,350 | Gray, green tinges. |
| 20/2a | 342 | Tb₁/₂Ca₁/₂TBO₅ | 0.500 | 1,350/2h | White. |
| 20/2a | 343 | Ce₁/₂Ca₁/₂TiBO₅ | 0.500 | 1,350 | Whitish yellow brown. |
| 20/2a | 344 | Pr₁/₂Ca₁/₂SnBO | 0.500 | 1,350 | White. |
| 20/2a | 345 | Tb₁/₂Ca₁/₂SnBO₅ | 0.500 | 1,350 | Do. |
| 20/2a | 346 | Ce₁/₂Ca₁/₂SnBO₅ | 1.000 | 1,350 | Greenish gray. |
| 21 | 347 | TaAlBO₅ | 0.500 | 1,350/2h | Whitish yellow. |
| 21 | 348 | CeAlBO₅ | 0.500 | 1,350 | Light gray. |
| 21 | 349 | CeCrBO₅ | 1.000 | 1,250/3h | Violet brown. |
| 21 | 350 | CeMnBO₅ | 1.000 | 1,250 | Black gray. |
| 21 | 351 | ThCrBO₅ | 1.000 | 1,250 | Brown olive. |
| 21 | 352 | ThMnBO₅ | 1.000 | 1,250 | Violet red. |
| 21 | 353 | ThFeBO₅ | 1.000 | 1,250 | Gray brown. |
| 21 | 354 | ThFeBO₅ | 1.000 | 1,250 | Brown olive tinges. |

Sphene mixed phases with 75 mol percent of CaSnSiO₅ plus 25 mol percent of CaTiSiO₅ as host

| Incorporation equation | Test No. | Compound incorporated | Quantity in g. | Max. temp. [° C.] | Color of the mixed phase |
|---|---|---|---|---|---|
| 3 | 355 | LaCrSiO₅ | 0.100 | 1,250/3h | Pink, gray tinges. |
| 21 | 356 | ThFeBO₅ | 0.500 | 1,250 | Gray yellow. |
| 8 | 357 | LaCoPO₅ | 1.000 | 1,250 | Blue-gray. |

Sphene mixed phases with 50 mol percent of CaSnSiO₅ plus 50 mol percent of CaTiSiO₅ as host

| Incorporation equation | Test No. | Compound incorporated | Quantity in g. | Max. temp. [° C.] | Color of the mixed phase |
|---|---|---|---|---|---|
| 3 | 358 | LaCrSiO₅ | 0.1000 | 1,250/3h | Pink |
| 21 | 359 | ThFeBO₅ | 0.500 | 1,250 | Gray yellow. |
| 8 | 360 | LaCoPO₅ | 1.000 | 1,250 | Blueish green gray. |

Sphene mixed phases with 25 mol percent of CaSnSiO₅ plus 75 mol percent of CaTiSiO₅ as host

| Incorporation equation | Test No. | Compound incorporated | Quantity in g. | Max. temp. [° C.] | Color of the mixed phase |
|---|---|---|---|---|---|
| 3 | 361 | LaCrSiO₅ | 0.100 | 1,250/3h | Brownish pink. |
| 21 | 362 | ThFeBO₅ | 0.500 | 1,250 | Gray yellow. |
| 8 | 363 | LaCoPO₅ | 1.000 | 1,250 | Gray green. |

What is claimed is:

1. Synthetic mixed phases of sphene structure corresponding to the general formula $MMeZX_5$ or $MMeZX_4Y$ and comprising as host components pure or isotype mixed phases in which M = calcium and/or barium, Me = titanium and/or tin, Z = silicon, X = oxygen and Y = fluorine and/or hydroxyl, comprising at least about 0.1 percent by weight of at least one guest component in place of the aforementioned host components without any change in the sphene structure or in the electroneutrality, the guest component for Z being a di-valent to pentavalent cation with an ionic radius of less than about 0.6 A. and/or a zinc cation, for Me being a mono- to hexavalent cation with a radius of from about 0.45 A. to about 1.0 A. and for M being a mono- to tetra-valent cation with a radius of greater than about 0.9 A., the stoichiometric quantities for (Me+M):Z:(X+Y) being about 2:1:5.

2. Synthetic mixed phases of sphene structure according to claim 1, wherein Z is replaced at least in part by a guest component which is one or more of beryllium (II), zinc (II), boron (III), aluminum (III), silicon (IV), germanium (IV), vanadium (IV), phosphorus (V), arsenic (V), vanadium (V), chromium (V), and manganese(V).

3. Synthetic mixed phases of sphene structure according to claim 1 wherein the host component comprises $CaTiSiO_5$.

4. Synthetic mixed phases of sphene structure according to claim 1 wherein the host component comprises $CaSnSiO_5$.

5. Synthetic mixed phases of sphene structure according to claim 1, wherein the host component comprises an isotype mixed phase of $CaTiSiO_5$ and $CaSnSiO_5$ of the formula $CaTi_{1-x}Sn_xSiO_5$ in which x = 0.01 to 99.9.

6. Synthetic mixed phases of sphene structure according to claim 1 wherein the guest component or components are present in an amount of about 0.1 to 50 percent by weight.

* * * * *

PO-1050
(5/69)

UNITED STATES PATENT OFFICE
CERTIFICATE OF CORRECTION

Patent No. 3,753,754      Dated August 21, 1973

Inventor(s) Franz Hund

It is certified that error appears in the above-identified patent and that said Letters Patent are hereby corrected as shown below:

Col. 1, line 30, Table - item 18, change "1.645" to -- 1.643 --.

Col. 2, line 10, change "MMeXZ$_4$Y" to -- MMeZX$_4$Y --.

Col. 3, lines 13 and 15, Table 2, items 4e and 5f, change "V$^I$" to -- VI --.

Col. 3, line 39, Table 3, change " O$^-$ " to -- O$^=$ --.

Col. 3, line 54, change "HG" to -- Hg --.

Col. 5, line 59, change "ov" to --or--.

Col. 6, line 12, change "in" to -- is --.

Col. 6, line 22, change "Table" to -- Tables --.

Col. 9, in the Table - test "57", under "Incorporation equation" change "4°" to -- 4 --.

Col. 13, in the title of the first table, change "CaTiSiO$_5$" to -- BaTiSiO$_5$ --.

Col. 17, in the title of the second table, change "CaSnSnSiO$_5$" to -- CaSnSiO$_5$ --.

Col. 17, Test 344, under "compound incorporated" change "Pr$_{1/2}$Ca$_{1/2}$SnBO" to -- Pr$_{1/2}$Ca$_{1/2}$SnBO$_5$ --.

Signed and sealed this 24th day of September 1974.

(SEAL)
Attest:

McCOY M. GIBSON JR.
Attesting Officer

C. MARSHALL DANN
Commissioner of Patents